United States Patent [19]

Ueda

[11] Patent Number: 5,277,798
[45] Date of Patent: Jan. 11, 1994

[54] SEWAGE TREATMENT EQUIPMENT WITH ACTIVATED SLUDGE PROCESS BED

[75] Inventor: Iwao Ueda, 416, Nanbacho, Mishikiyamachidori Matsubarasagaru, Shimogyo-ku, Kyoto, Japan

[73] Assignees: Iwao Ueda; Chie Ueda, Kyoto, Japan

[21] Appl. No.: 11,631

[22] Filed: Feb. 1, 1993

[30] Foreign Application Priority Data

Feb. 28, 1992 [JP] Japan .................................. 4-079160

[51] Int. Cl.$^5$ .............................................. C02F 3/06
[52] U.S. Cl. .................................. 210/151; 210/195.1; 210/202; 210/259
[58] Field of Search ................ 210/150, 151, 175, 194, 210/195.1, 196, 201, 202, 195.3, 220, 259, 615

[56] References Cited

U.S. PATENT DOCUMENTS

| | | | |
|---|---|---|---|
| 3,878,097 | 4/1975 | Mochijinki et al. ................ | 210/151 |
| 3,966,599 | 6/1976 | Burkherd ............................ | 210/157 |
| 4,045,344 | 8/1977 | Yokota ................................ | 210/157 |
| 4,680,111 | 7/1987 | Ueda ................................... | 210/150 |
| 4,925,552 | 5/1990 | Bateson et al. .................... | 210/150 |

FOREIGN PATENT DOCUMENTS 1-60316 12/1989 Japan .

*Primary Examiner*—Christopher Upton
*Attorney, Agent, or Firm*—Lowe, Price, LeBlanc & Becker

[57] ABSTRACT

Sewage treatment is carried out at high performance from a treatment at high load to a treatment at low load at all times, irrespective of seasonal change and region where sewage treatment equipment is installed, and no excess sludge is discharged outside the equipment at all. Whirl water flow generating means and a heating pipe are disposed in sewage treatment tanks in which a number of activated sludge process beds and aeration pipes are disposed. A sewage water under treatment is returned from a third sewage treatment tank, to first and second treatment tanks, for example. A sedimentation tank and a sludge digestion tank are also disposed so as to supply the supernatant obtained after the sludge treatment to the first sewage treatment.

1 Claim, 6 Drawing Sheets

SEWAGE TREATMENT EQUIPMENT WITH ACTIVATED SLUDGE PROCESS BED

BACKGROUND OF THE INVENTION

1. Field of the invention

The present invention relates to a sewage treatment system or equipment for treating sewage water such as industrial effluent, various home life waste waters, etc. and, more particularly, to a sewage treatment equipment for oxidatively decomposing and eliminating water pollution materials such as BOD, COD by causing seawage water to contact, in the presence of air, an activated sludge process bed in which micro-organism (i.e., activated sludge) is placed on a carrier (i.e., fixed bed) and cultivated therein.

2. Description of prior art

With respect to the sewage treatment for oxidatively descomposing and eliminating water pollution materials such as BOD, COD contained in sewage water discharged from factories, hotels, homes and the like, the applicant has already proposed a sewage treatment equipment with activated sludge process beds in which a plurality of treatment tanks are installed in a row each communicating with an adjacent tank through a channel, and each of the treatment tanks comprises a plurality of activated sludge process beds disposed vertically above an aeration pipe connected to an air in-flow pipe and disposed at the bottom of each sewage treatment tank, each of the activated sludge process bed comprising a cylindrical core of which mesh-like or grid-like outer perphery is wrapped with a porous member of a certain thickness and tightened by tightening means, as is disclosed in the Japanese Patent Piblication (examined) No. 60316/1989. In this prior sewage treatment equipment, area of the mentioned outer periphery of the cylindical core wrapped with the porous member in each of the activated sludge process beds is increased tank by tank according to disposition of the treatment tanks so as to give variety to kind of bacteria, breeding ratio between aerobic and anaerobic bacterias and distribution thereof tank by tank in the order of instllation of the tanks.

In the sewage treatment equipment of above arrangement, when some air is supplied to the aeration pipe disposed at the bottom of each sewage tratment tank through the air in-flow pipe, the air is blown out into the sewage water in a form of bubbles through a lot of slits formed on the surface of the aeration pipe, and the sewage water containing oxigen of the air dissolved thereinto comes in contact with the activated sludge process beds above the aeration pipe. Thus, the water pollution materials such as BOD, COD are decomposed by aerobic and anarobic bacteria both implanted and cultivated on the activated sludge process beds. Meanwhile, these aerobic and anaerobic bacterias are further bred utilizing a part of energy obtained at the time of decomposition. In this connection, since each of the activated sludge process beds is cylindrical, there is a difference of dissolved oxygen concentration (hereinafter refferred to as DO value) between outside and inside of the cylinder, and aerobic bacteria is bred a lot on the outer peripheral surface of the bed, while anaerobic bacteria is bred on the inner peripheral surface of the bed. Then, giant micro-organism such as Zooglea bacteria, sphaerotilus, Nematoda or water mite are spontaneously bred or come to live at the center portion of the porous member of the activated sludge process bed and eat away both aerobic and anaerobic bacterias to autolize them. Therefore, excessive increase or breeding of aerobic bacteria to produce excessive sludge is successfully prevanted. Since a plurality of sewage treatment tanks are installed in a row, one tank being communicatted with the other tank adjacent through a channel, when DO value is changed by reducing the air supply from the aeration pipe to each tank in the order of installation of the tanks, there is a variation tank by tank in the aspects of kind of bacteria, ratio of aerobic to anaerobic bacteria, distribution of giant micro-organism, etc. cultivated in each sewage treatment bed. Thus, it becomes possible to utilize characteristics of respective micro-organism according to process of treatment, i.e., excellent performance of aerobic exhibited in the treatment of BOD, COD, etc. being at high load and that of anaerobic bacteria in the treatment of BOD, etc. being at low load as well as in the decomposition of nitrogen.

The foregoing improvement in the treatment efficiency depends largely on accurate control for achieving appropriate DO value. From this point of view, in the case of each activated sludge process beds used in the sewage treatment equipment according to the present invention, variety is given to the flow rate of the sewage water of which DO value is increased depending on the outside or inside of the cylinder by changing physical environment of the bed, i.e., cylindrical area wrapped with the porous member tank by tank in order. As a result, the control of BO value is quite accurate and easy both inside and outside of the cylindrical bed, and it is possible to control DO value appropriately keeping the nutritive balance in respective tanks disposed in a row, and accordingly the most suitable breeding phase of bacteria is constantly formed according to each process of the treatment. Thus, stable and efficient sewage treatment is constantly performed for long.

When employing the sewage treatment equipment of above arrangement disclosed in the Japanese Patent Publication No. 60316/1989, various advantages are assured such that even when the amount of air supply from the aeration pipe is kept as it was set at the starting of operation, a quite efficient sewage treatment is performed by the treatment equipment as a whole in spite of variation in BOD and COD in the sewage water, and it is possible to treat the sewage water at high efficiency at all times. Besides, the day-to-day operation control is easy and it does not require much labor.

However, in the mentioned sewage treatment equipment disclosed in the Japanese Patent Publication No. 60316/1989, sewage water simply flows into the first tank filling it and further flows into the next tank while overflowing from the first tank in such a manner as to flow slowly through every treatment tank with the in-flow air supplied by the aeration pipe. Therefore, a disadvantage may arise such that conditions of micro-organism membrance formed on the actvated sludge process beds are variable between upper region and bottom region of each bed, between center region and periphery region, or depending upon position of the disposed bed in a tank. To meet such a disadvantage, the prior equipment is controlled so as to give variety tank by tank to kind of bacteria, ratio of aerobic bacteria to anaerobic bacteria, etc. composing the activated sludge. However, there still remains a problem of not forming a particular kind of activatd sludge actually required by each tank depending upon portion of the bed in a tank.

Accordingly, treatment efficiency of the entire tank is declined and, as a result, the expected sewage treatment performance of the entire equipment from high load treatment to low load treatment is not always satisfiably achieved.

Further, in the known sewage treatment of above arrangement, it is sometimes the case that no satisfiable sewage treatment is achieved due to seasonal change or climate pertinent to a district where the equipment is installed and operated. Furtheremore, when employing the mentioned prior sewage treatment equipment, it is certain that excess sludge is reduced remarkably as compared with the conventional activated sludge process. But in the high load treatment for treating an untreated sewage of which concentration of water pollution material mounts to 300 to 3,000 ppm, for example, a small amount of excess sludge is still produced even if using the mentioned equipment. Accordingly, it is required for such excess sludge to be regularly discharged out of the equipment, and it is a matter of course that additional cost is needed for such treatment of excess sludge. Moreover, when employing the prior sewage treatment of above arrangement, it is certain that water pollution materials including BOD, COD, etc. at high removing rate, but perfect decoloring of the treated water is difficult.

SUMMARY OF THE INVENTION

The present invention was made to solve the above-discussed problems and has an object of providing an improved sewage treatment equipment in which a plurality of sewage treatment tanks are provided side by side and, in each of the sewage treatment tanks, a plurality of activated sludge process beds are vertically disposed and an aeration pipe is disposed at the bottom, and in which sewage treatment performance of respective treatment tanks is improved so that the entire equipment may treat sewage water with high efficiency at all times covering from high load treatment to low load treatment and that satisfiable sewage treatment performance is achieved irrespective of season and/or area where it is installed, without discharging any excess sludge as it is out of the equipment at all while discharging perfectly treated decolored water.

To accomplish the foregoing object, a sewage treatment equipment according to the invention comprises whirl water flow generating means for inhaling sewage water from bottom of each of the sewage treatment tanks and blowing the inhaled sewage water from the bottom center of each tank up to the liquid surface thereby generating whirl flow of sewage water in the tank, and a heating pipe which is connected to a heating medium circulator and through which heated medium such as hot water is caused to flow. The mentioned whirl water flow generating means and the heating pipe are both disposed in every sewage treatment tank at their bottom. The equipment also comprises sewage water circulating means for returning a part of sewage water under treatment from the sewage treatment tanks, except first tank, to their preceding tank or tanks (for example, in the equipment comprising four sewage treatment tanks, a part of sewage water under treatment may be returned from the third tank to the first and second tanks). The equipment further comprises a sedimentation tank and a sludge digestion tank disposed in addition to the plurality of sewage treatment tanks. The sedimentation tank is communicated to the final sewage treatment tank through a passage so as to send excess sludge sedimented on the bottom of the sedimentation tank to the sludge digestion tank where the sent excess sludge is digested, while sending supernatant obtained after the sludge treatment from the sludge digestion tank to the first sludge treatment tank.

In the sewage treatment tank of above arrangement, sewage water in each of the sewage treatment tanks is stirred by the whirl water flow generating means, and the sewage is sufficiently moved flowing in the entire tank. Accordingly, a required kind of activated sludge by every treatment tank is formed entirely throughout the tank irrespective of position in the same tank, whereby treatment performance in the whole treatment tank is improved. Further, since heating means is disposed at the bottom part of each sewage treatment tank, temperature of sewage water may be maintained at a temperature required to keep sludge alive at all times even when it is winter or when the treatment equipment is installed at any cold zone. Even in case that concentration of water pollution material in the raw sewage water introduced in the sewage treatment equipment is high, since a part of sewage water of lower concentration under treatment is flown back from the second sewage treatment tank and other tanks to the first treatment tank, the raw sewage water is diluted, whereby the high concentration of the water pollution material is adjusted to a low concentration suited for the treatment. Further, since sewage water is flown back from the second tank and other tanks to the first tank, the time taken from the introduction of raw sewage water into the sewage treatment tanks to the discharge thereof to outside in the form of treated water, i.e., the time during which sewage water remains in the plural treatment tanks to be treated therein can be controlled; in other words, percentage of removing water pollution material can be established to be optimum for the entire treatment system. Furthermore, even if a small amount of excess sludge is produced in the process of sewage water treatment, the excess sludge may be treated in the sedimentation tank and sludge digestion tank installed together with the sewage treatment tanks, and is never discharged outside the equipment. Though supernatant left after the digestion of sludge is of high COD concentration, the treatment water is not discharged outside the equipment but fed back to the first sewage treatment tank. Here, there may be an anxiety that when returning the treated water of high COD concentration to the sewage water treatment tank, COD concentration of the sewage water is gradualy increased resulting in occurrence of bulking. But, as mentioned above, since the sewage water of low concentration under treatment is fed back to the first treatment tank and the sewage treatment is conducted at very high performance, there is no occurrence of bulking.

In the sewage treatment equipment of above arrangement and function, when empolying the equipment according to the present invention to carry out purification treatment of sewage water such as the one discharged from factories, plants, homes, it becomes possible to treat sewage at high performance at all times from high load treatment to low load treatment. Thus, sufficient sewage treatment performance is assured at all times irrespective of seasonal change or climate in the region where the system is installed. Moreover, there is no discharge of excess sludge outside the system at all and, as a result, labor for discharging work of excess sludge outside the equipment and cost for such disposal of excess sludge are both saved. When employing the sewage treatment system according to the invention, concentration of water pollution materials may be reduced to 5 to 0ppm, and a colorless and transparent treated water is drained out of the equipment.

Other objects, features and advantages of the invention will become apparent in the course of the following description in conjunction with the accompanying drawings.

DESCRIPTION OF THE PREFERRED EMBODIMENT

An preferred embodiment of the present invention is hereinafter described with reference to the accompanying drawings.

Figure 1:
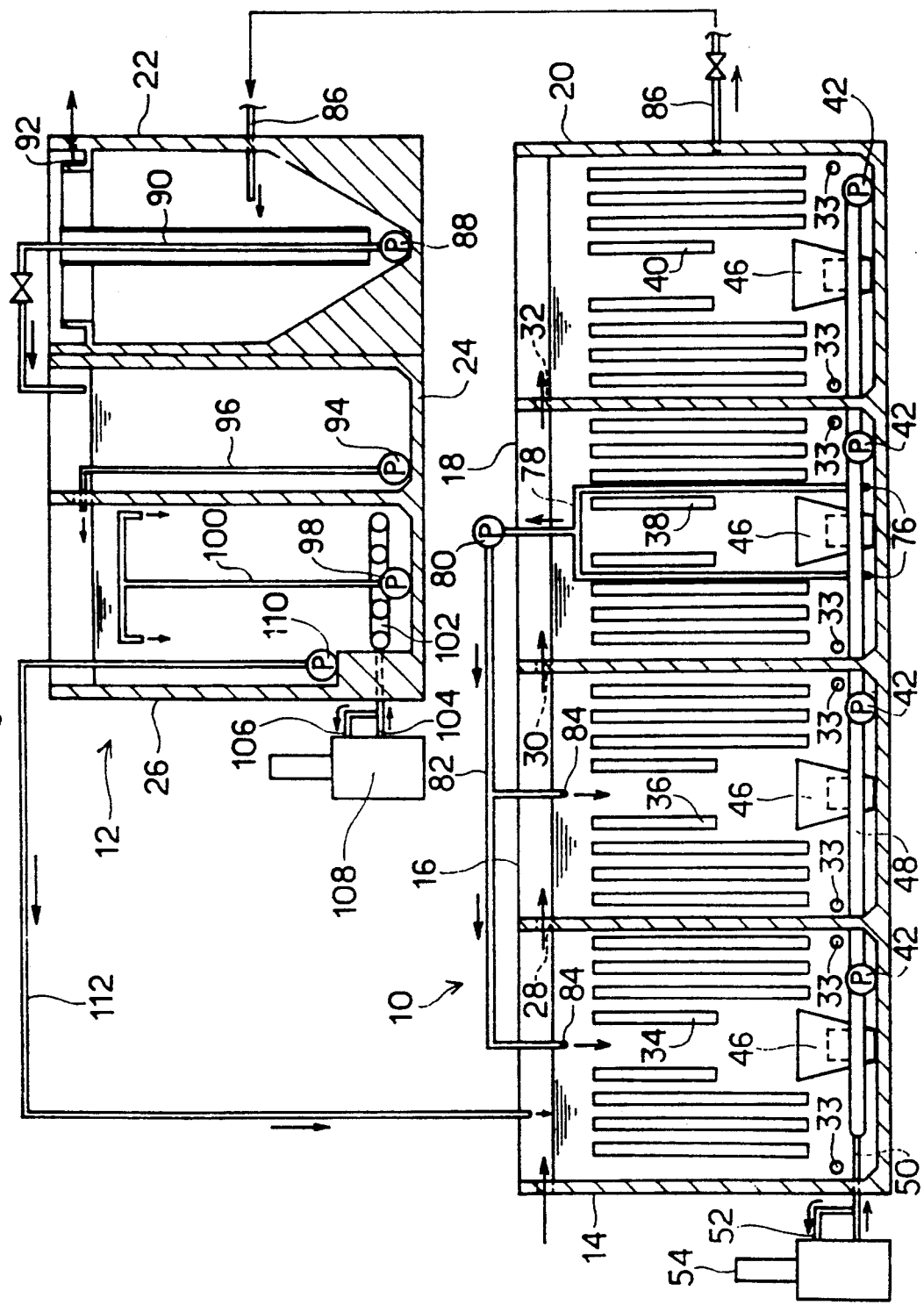
FIG. 1 is a sectional front view of a sewage treatment equipment with activated sludge process beds as an embodiment of the present invention.
Figure 2:
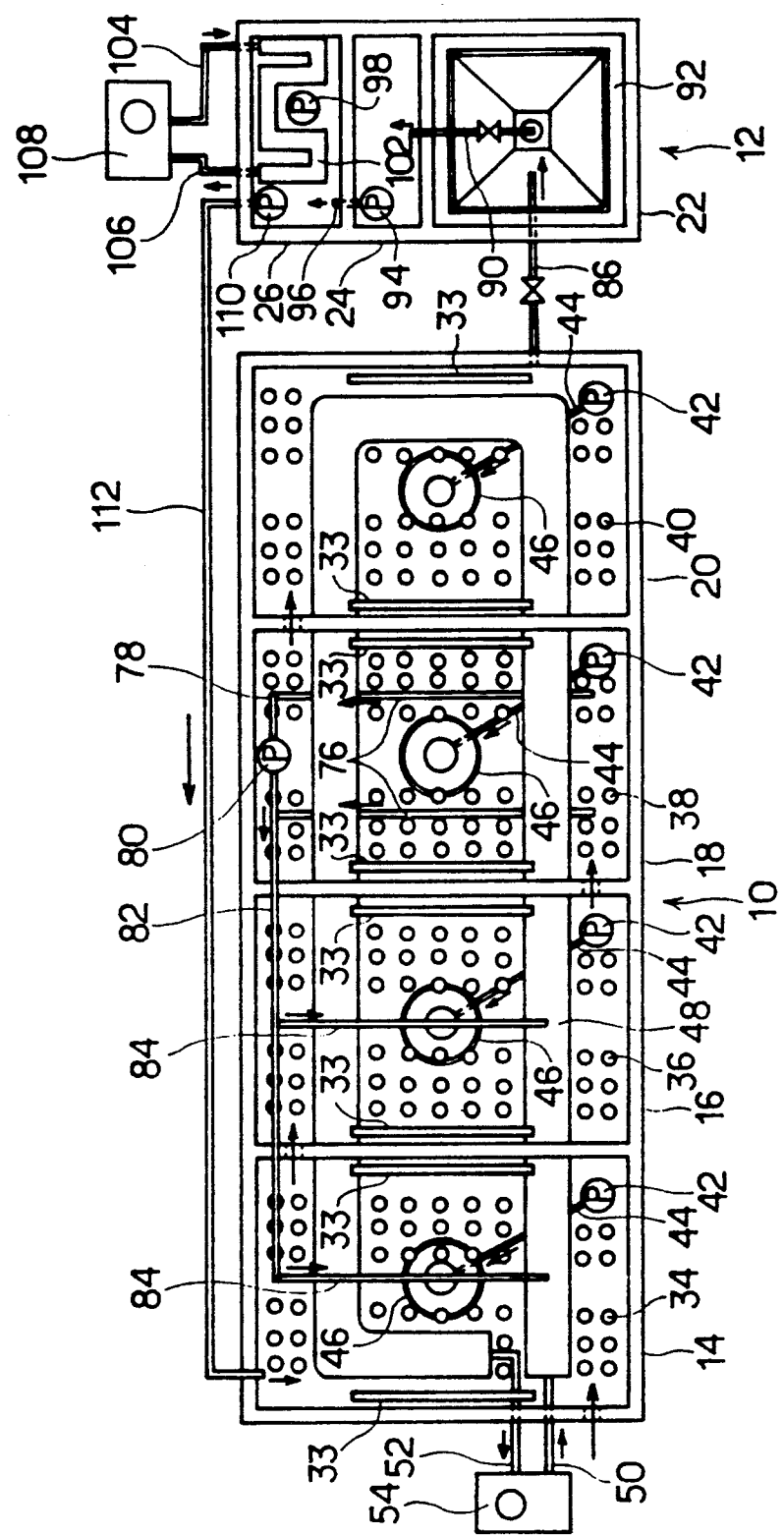
FIG. 2 is a plan view of the equipment shown in FIG. 1.

FIG. 1 and 2 show an embodiment of the invention, and in which FIG. 1 is a front sectional view showing an entire arrangement of the sewage treatment equipment with activated sludge process beds and FIG. 2 is a plan view thereof. Note that FIG. 1 depicts four sewage treatment tanks and an excess sludge process section separately in upper and lower parts, thus location of the excess sludge process section is different from that in FIG. 2.

The sewage treatment equipment of this embodiment comprises a sewage treatment section 10 and an excess sludge treatment section 12. The sewage treatment section 10 comprises four sewage treatment tanks 14, 16, 18, 20 installed side by side, and the excess sludge treatment section 12 comprises a sedimentation tank 22, an excess sludge storage tank 24 and a sludge digestion tank 26.

Communicated to the upper part of a first sewage treatment tank 14 of the sewage treatment section 10 is a raw sewage water introduction pipe (not illustrated), and two sewage treatment tanks adjacent each other are communicated to each other through flow passages 28, 30, 32 respectively formed on the upper part of the bulkhead.

A pair of aeration pipes 33 connected to an air in-flow pipe (not illustrated) are respectively disposed at two ends of the inner bottom part of every sewage treatment tank 14, 16, 18, 20. A plurality of activated sludge beds 34, 36, 38, 40 are vertically disposed above each aeration pipe 33 in every sewage treatment tank 14, 16, 18, 20 in such a manner that upper and lower ends of the beds are supported by supporting rods (not illustrated). Further, in the inner bottom part of every sewage treatment tank 14, 16, 18, 20, a submergible pump 42 is disposed. And sewage flow guide members 46 each connected via a conduit 44 to a discharge opening of each submergible pump 42 are respectively disposed in the center part. An elongated heating pipe 48 is also disposed near the bottom face of each sewage treatment tank 14, 16, 18, 20. This heating pipe 48 is connected through a passage to a heat source 54 comprising a boiler and a circulating pump via an introduction pipe 50 and a discharge pipe 52, thus a hot water is caused to flow circulatably within the heating pipe 48.

Figure 4:
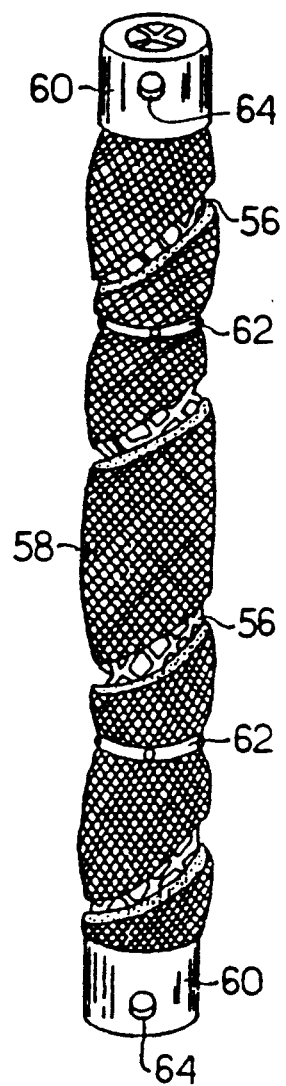
FIG. 4 is a perspective view showing one example of the entire arrangement of an activated sludge process bed employed in the mentioned sewage treatment equipment.
Figure 5:
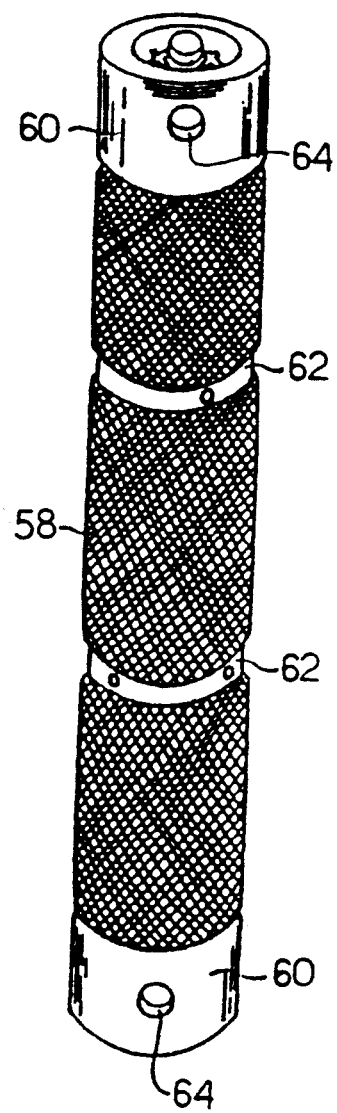
FIG. 5 is a perspective view of the entire arrangement of an activated sludge process bed.
Figure 6:
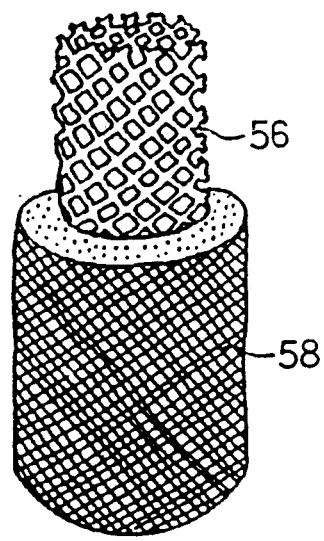
FIG. 6 is a partial perspective view of an activated sludge process bed with a part cut out.

Each activated sludge process bed, of which partially cutout enlarged view is shown in FIG. 6., comprises a cylindrical core 56 of a hard synthetic resin resistant to corrosion for a long period of immersion having a mesh-like or grid-like peripheral surface, a porous member 58 with which this cylindrical core 56 is wrapped at a certain thickness, i.e., about 15-20 mm in thickness, tightening rings 60 for tightening upper and lower parts of each bed as shown in FIGS. 4 and 5, and a tightening belts 62 for tightening the porous member 58 to the cylindrical core 56 at several portions. In addition, numeral 58 indicates holes perforated on each tightening ring 60 to insert support rods for supporting the beds therethrough. The porous member 32 is formed of a lot of corrosion resistant chloride yarns intertwisted one another or other spongy, mesh-like or fibrous synthetic resin. These activated sludge process beds 34, 36, 38, 40 have different forms respectively tank by tank. FIGS. 4 and 5 respectively show an example thereof. That is, in the case of the activated sludge process bed shown in FIG. 4, the porous member 58 is spirally cut with a certain width so that the cylindrical core 56 is partially exposed as much. In the case of the activated sludge process bed shown in FIG. 5, the entire surface of the cylindrical core 56 is covered with the porous member 58.

In addition, it is also preferable that external form of each activated sludge bed is varied to be triangular, cylindrical, square in section, thereby giving variation in the arrangement of respective activated sludge process beds, instead of varying surface area of the cylindrical core 56 covered with the porous member 58 (i.e., exposed area of the cylindrical core 56 by partial cutout of the porous member 58).

Figure 3:
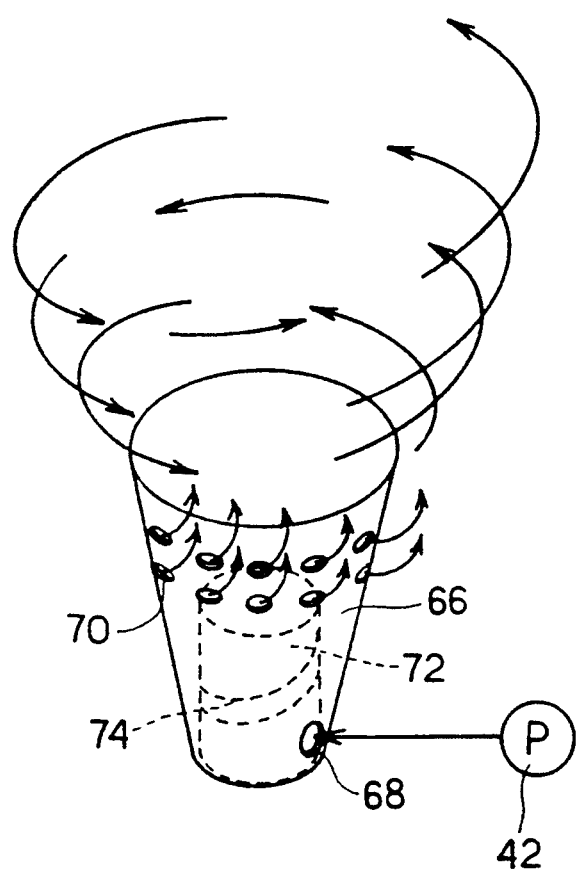
FIG. 3 is a perspective view showing one example of the arrangement of a sewage flow guide plate employed in the mentioned sewage treatment equipment.

As shown in FIG. 3, in each sewage flow guide member 46, diameter of its cylindrical shape is divergent upwardly, upper end face closed, and an end connection 68 to which the conduit 44 connected to the submergible pump 42 is communicated is formed at the lower part. Each sewage flow guide member 46 further comprises an outer casing 66 on the upper part of which a large number of exhaust ports 70 are formed; and an inner casing 72 of cylindrical shape with its upper end closed, and on the lower part of which an in-flow port (not illustrated) communicated to the conduit 44 is formed, and on the peripheral surface of which a spiral groove 74 is formed, and which is disposed inside the outer casing 66. Thus, when sewage water is introduced from the sewage treatment tanks 14, 16, 18, 20 into the submergible pumps 42 and the introduced sewage water is supplied to the internal part of the inner casing 72 of the sewage flow guide member 46 via the conduit 44, then the sewage water is exhausted from the sewage flow guide member 46 through the spiral groove 74 of the inner casing 72 and the exhaust ports 70 of the outer casing 66, whereby whirl flow of sewage water flowing from the center portion of the tank bottom upward to liquid surface is generated.

Disposed in the inner bottom of the third sewage treatment tank is a water suction pipe 76 on which a plurality of suction ports are formed. The water suction pipe 76 is connected through a passage to a suction opening of a circulating pump 80 via a conduit 78. Discharge opening of the circulating pump 80 is connected through a passage to each of water supply pipes 84 which are respectively disposed on the upper part of the first sewage treatment tank 14 and second sewage treatment tank 16, and having a plurality of discharge ports. Accordingly, when driving the circulating pump 80, a part of the sewage water under treatment in the third sewage treatment tank 18 is caused to flow back to the first and second sewage treatment tanks 14 and 16.

The fourth sewage treatment tank 20 and the sedimentation tank 22 of the excess sludge treatment section 12 are communicated to each other via a communicating pipe 86. An excess sludge transfer pump 88 is disposed in the inner bottom of the sedimentation tank 22. By operating the pump 88, excess sludge deposited on the bottom of the sedimentation tank 22 is transferred via a transfer pipe 90 to an adjacent excess sludge storage tank 24. An overflow tank 92 is formed on the upper part of the sedimentation tank 22, and to this overflow tank 92 a treated water discharge pipe (not illustrated) is connected. Any treated water flowing into the overflow tank 92 is discharged out of the equipment via the treated water discharge pipe.

Further, a excess sludge transfer pump 94 is disposed at the inner bottom of the excess sludge storage tank 24 so that excess sludge deposited on the bottom of the sedimentation tank 22 may be transferred through the transfer pipe 90 to the adjacent excess sludge storage tank 24. A submergible pump 98 is disposed in the center bottom of the sludge digestion tank 26. When driving the submergible pump 98, the sludge on the tank bottom is sucked in the submergible pump 98, then sent up toward the liquid surface through the discharge pipe 100, and discharged out of the discharge pipe 100 near around the liquid surface. The sludge discharged out of the discharge pipe 100 flows toward the tank bottom, and sucked again in the submergible pump 98. While the sludge is circulatively flowing into the sludge digestion tank 26, a chemical containing an emulsifying surfactant and saponin is adequetely added to the flowing sludge so that digestion of the sludge may take place. A heating pipe 102 is disposed near the bottom of the sludge digestion tank 26. This heating pipe 102 is connected through a passage to a heating source 108 comprising a boiler and a circulating pump via an introduction pipe 104 and an exhaust pipe 106, thus a heated water is caused to flow circulatively within the heating pipe 102. Further, a liquid supply pump 110 is disposed in the sludge digestion tank 26 so that a liquid obtained by digestion of sludge in the sludge digestion tank (supernatant) may be supplied into the first sewage treatment tank 14 by the liquid supply pump 110 via a liquid supply pipe 112.

In the sewage treatment equipment of above arrangement, sewage treatment is carried out in the following manner.

When a sewage water is brought in the first sewage treatment tank 14, the sewage water goes flowing sequentially from the first sewage treatment tank 14 to the second sewage treatment tank 16 via the overflow passage 28, from the second sewage treatment tank 16 to the third sewage treatment tank 18 via the overflow passage 30, and from the third sewage treatment tank 18 to the fourth sewage treatment tank 20 via the overflow passage 32. And, in each sewage treatment tank 14, 16, 18, 20, air supplied from the air supply blower (not illustrated) to the aeration pipe 33 via the air in-flow pipe is flown into the sewage water from the pair of aeration pipes 33, 33, whereby oxygen is dissolved and dispersed into the sewage water. The sewage water containing such dissolved oxygen (DO) comes in contact with the number of activated sludge beds 34, 36, 38, 40 vertically provided respectively in the sewage treatment tanks. Water pollution materials such as BOD, COD, etc. are decomposed by aerobic and anaerobic bacterias implanted and cultivated in the activated sludge process beds 34, 36, 38, 40, while the aerobic and anaerobic bacterias are increasingly bred utilizing a part of energy obtained at the time of such decomposition.

In this connection, since every activated sludge process bed 34, 36, 38, 40 is cylindrical, there is a difference of the DO value between outside and the inside of the cylinder, and generally aerobic bacteria is bred a lot on the outer perpheral surface of the bed, while anaerobic bacteria are bred on the inner peripheral surface of the bed. Then, giant micro-organisms such as Zooglea bacteria, sphaerotilus, Namatoda or water mite are spontaneously bred or come to live at the center portion of the porous member of the activated sludge process beds 34, 36, 38, 40 and eat away both aerobic and anaerobic bacteria to autolize them. Therefore, excessive increase or breeding of aerobic bacteria to produce excessive sludge is successfully prevented, whereby production of excess sludge is prevented. Since in every of the activated sludge process bed 34, 36, 38, 40 respectively disposed in the first, second, third and fourth sewage treatment tanks 14, 16, 18, 20, physical environments, i.e., the area exposed after covering the cylindrical core 56 with the porous member 58 varies tank by tank, flow rate of sewage water of increased DO value inside and outside of the cylinder also varies tank by tank. Accordingly, there is a variation tank by tank in the aspects of kind of bacteria, radio of aerobic bacteria to anaerobic bacteria, distribution of giant micro-organism, etc. cultivated in every activated sludge process bed 34, 36, 38, 40 and forming the activated sludge. When changing DO value in each sewage treatment tank 14, 16, 18, 20 by reducing the rate of air supply from the aeration pipe 33 to each tank according to the order of installation of the sewage treatment tanks 14, 16, 18, 20, the activated sludge process bed 34, 36, 38, 40 each having a breeding phase comprising the aerobic and anaerobic bacterias are formed with their individual characteristics. Thus, as a result of forming the activated sludge process beds as mentioned above, it becomes possible to utilize characteristics of respective micro-organism according to the progress of the treatment, i.e., excellent performance of aerobic bacteria being exhibited in the treatment of BOD, COD, etc. at high load and that of anaerobic bacteria in the treatment of BOD, etc. at low load as well as in the decomposition of nitrogen, while balancing nutritively the air, nitrogen and phosphorus they need according to the progress of the treatment.

In the sewage tratment equipment of the mentioned arrangement, sewage water in each of the sewage treatment tanks 14, 16, 18, 20 is caused to flow upward in the form of whirl flow of sewage water from the sewage flow guide member 46 after the suction in the submergible pump 42, then moves flowing toward the tank bottom to be sucked again in the submergible pump 42. In other words, the sewage water is caused to flow circulating within each tank and, as a result, activated sludge of a kind required for a particular treatment is averagely formed throughout the tank. For operating the sewage treatment equipment of this embodiment in winter or at a cold zone, a hot water is caused to flow through the heating pipe 48 so that temperature of sewage water is controlled and kept to a temperature range allowing the sludge to be alive. Furthermore, in this sewage treatment equipment, a part of sewage water in the third sewage treatment tank 18 is sucked by the circulating pump 80 via the water suction pipe 76, and the sucked sewage water is returned or fed back to the first and second sewage treatment tanks 14 and 16 via the water supply pipe 80. At this time, by appropriately adjusting the feedback rate of sewage water, it may be possible for the concentration of water pollution material of raw sewage water to be adjusted or diluted to a required concentration, or for the treatment time of sewage water treatment in the sewage treatment section to be adjusted to a required time.

In the meantime, the sewage water which has been treated to a very low water pollution material concentration of 5 to 0 ppm during the sequential passage through the first, second, third and fourth sewage treatment tanks 14, 16, 18, 20 then flows into the sedimentation tank 22 from the fourth sewage treatment tank 20 via the communication pipe 86. At this time, a small amount of excess sludge may be contained in the sewage water. This excess sludge in the sewage water goes dropping and deposited on the tank bottom. This deposited excess sludge is delivered from the bottom of the sedimentation tank 22 to the excess sludge storage tank 24 via the transfer pipe 90. On the other hand, the supernatant flows into the overflow tank 92 and finally discharged out of the equipment in the form of a treated, purified and discolored water through the discharge pipe.

The excess sludge stored in the excess sludge storage tank 24 is then delivered to the sludge digestion tank 26 via the transfer pipe 96 by means of the excess sludge transfer pump 94. The excess sludge is subject to the digestion in the sludge digestion tank 26 and liquefied. This liquid of digested sludge (supernatant) is not discharged out of the equipment because of its high COD concentration, but sent back to the first sewage treatment tank 14 via the liquid supply pipe 112, and treated together with the raw sewage water in the sewage treatment section 10. As described so far, the sewage treatment is carried out without discharging excess sludge and digested liquid thereof out of the equipment at all. In addition, insoluble inorganic materials are adequately discharged from the bottom of the sludge digestion tank 26.

It is further understood by those skilled in the art that the foregoing description is a prefered embodiment of the disclosed device and that various changes modifications may be made in the invention without departing from the spirit and scope thereof.

What is claimed is:

1. In a sewage treatment equipment with activated sludge process beds in which a plurality of treatment tanks are arranged in a row, each communicating with an adjacent tank through a passage, and each of the treatment tanks comprising a plurality of activated sludge process beds disposed vertically above an aeration pipe which is connected to an air in-flow pipe and disposed at the bottom of each tank, each of the activated sludge process beds comprising a cylindrical core of which mesh-like or grid-like outer periphery is wrapped with a porous member of a certain thickness and tightened by tightening means, and in which outer peripheral area of the cylindrical core wrapped with the porous member in each activated sludge bed is increased tank by tank according to disposition of the tanks so as give variety to kind of bacteria, breeding ratio between aerobic and anaerobic bacterias and distribution thereof tank by tank in order, the improvement comprising:

spiral flow generating means at the bottom of each of the sewage treatment tanks comprising means for pumping sewage water from a central part of the bottom of each tank and flow guide means for directing the pumped water in a spiral flow upward to the liquid surface;

a heating pipe in each tank which is connected to a heating medium circulator and through which heated medium such as hot water is caused to flow;

sewage water circulating means for returning a part of sewage water under treatment from at least one sewage treatment tank, except for the first tank, to at least one preceding tank providing means to control by dilution of water pollution material concentration of raw sewage water and control time of treatment in the tank;

a sedimentation tank communicating with a final sewage treatment tank through a passage;

a sludge digestion tank connected to said sedimentation tank for digesting excess sludge sedimented on the bottom of said sedimentation tank; and sludge treated water supply means for sending supernatant obtained after the sludge treatment from said sludge digestion tank to the first sludge treatment tank.

* * * * *